Jan. 16, 1945.          J. A. PALMER ET AL          2,367,308
AIRCRAFT AND GUN TURRET CONSTRUCTION
Filed May 31, 1940          4 Sheets-Sheet 1
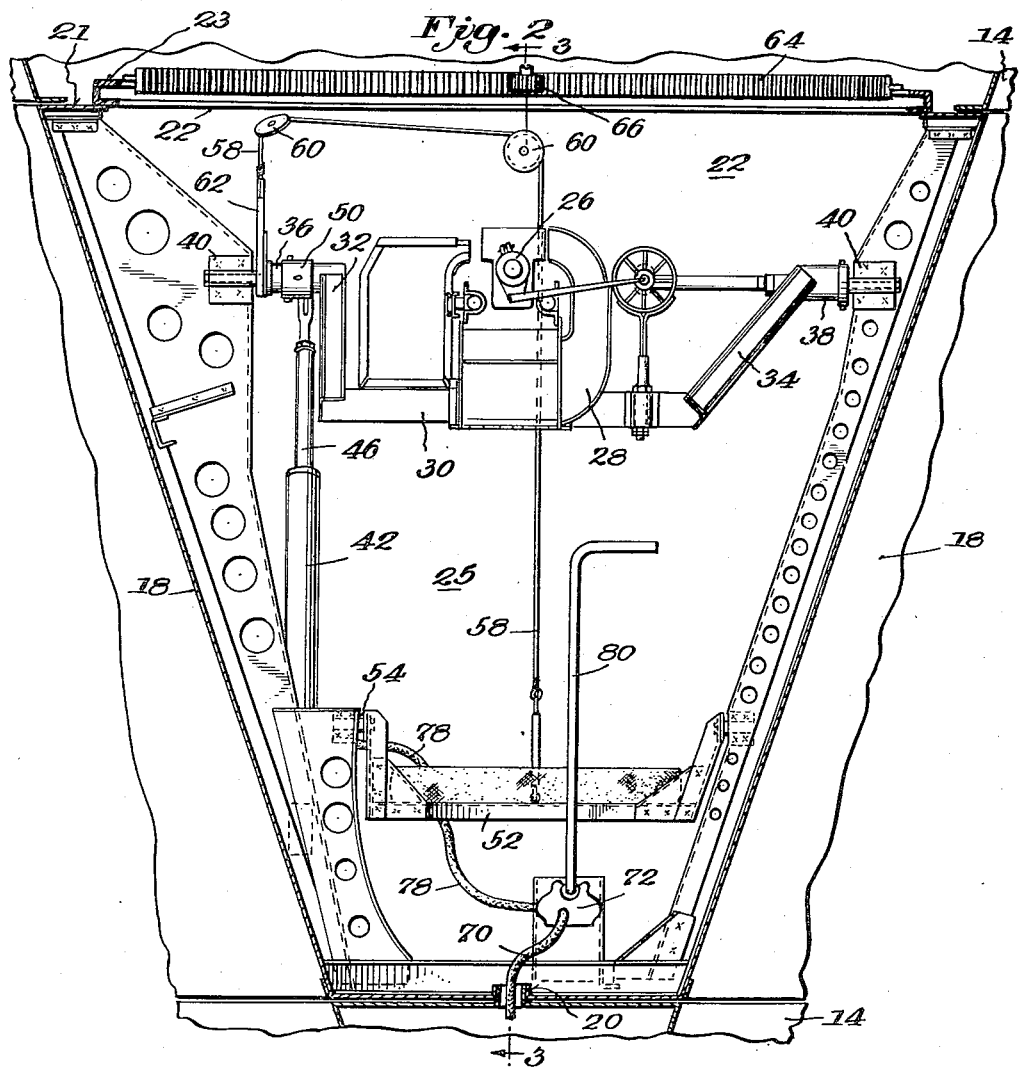
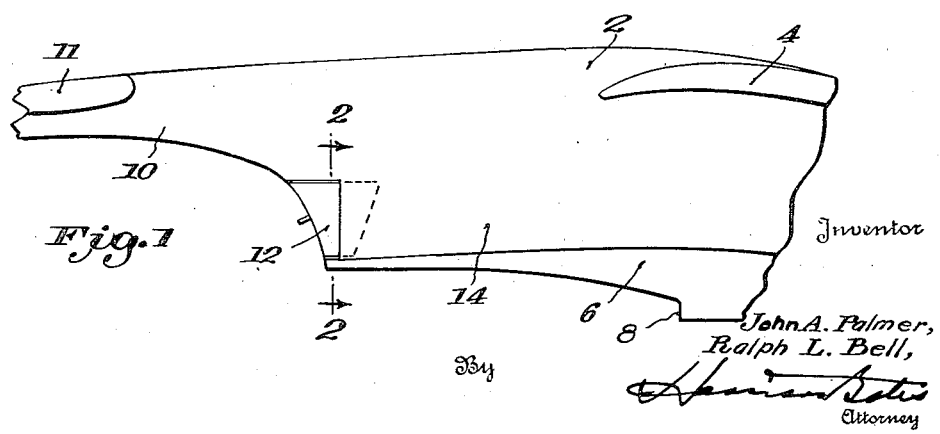
Inventor
John A. Palmer,
Ralph L. Bell,
By
Attorney

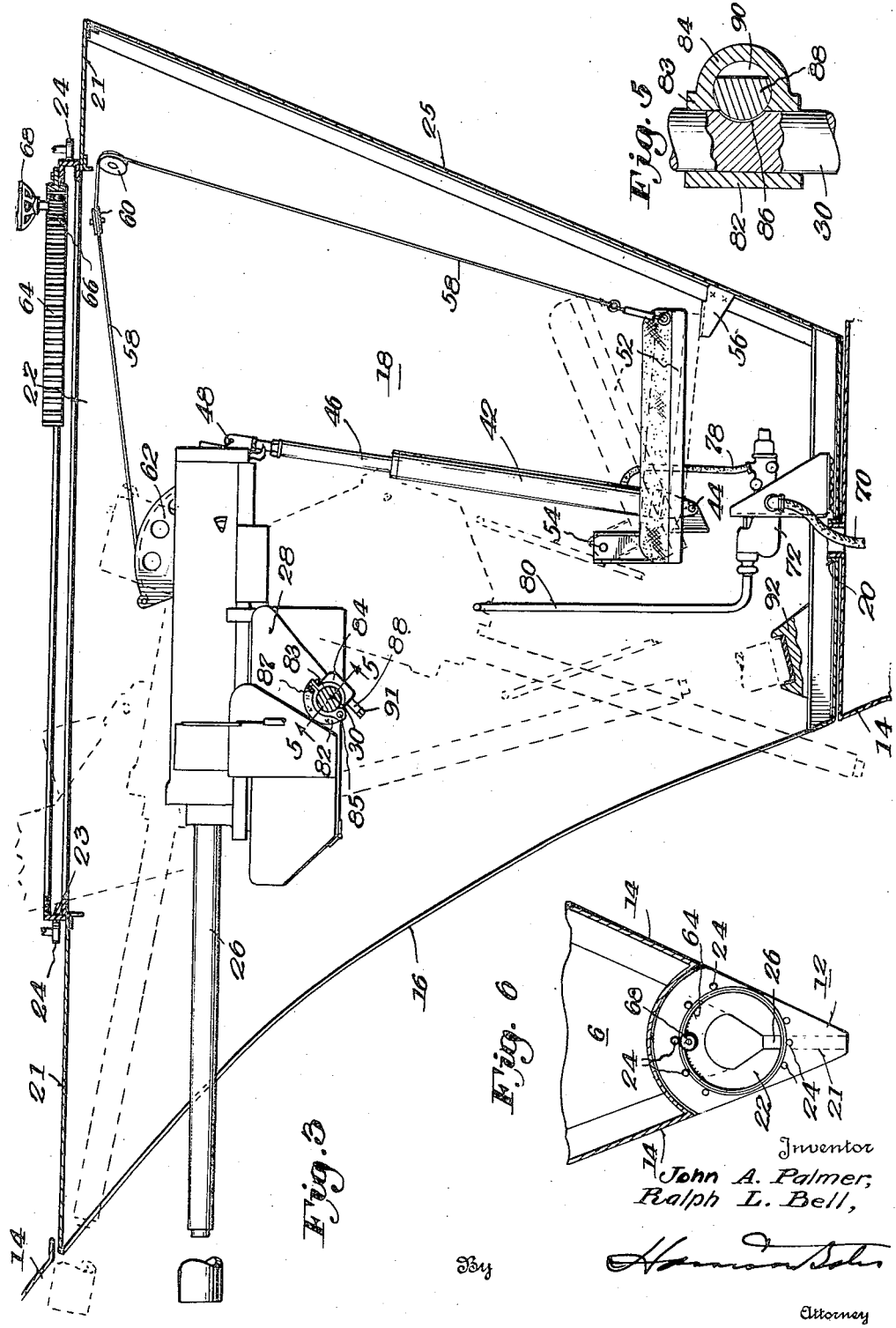

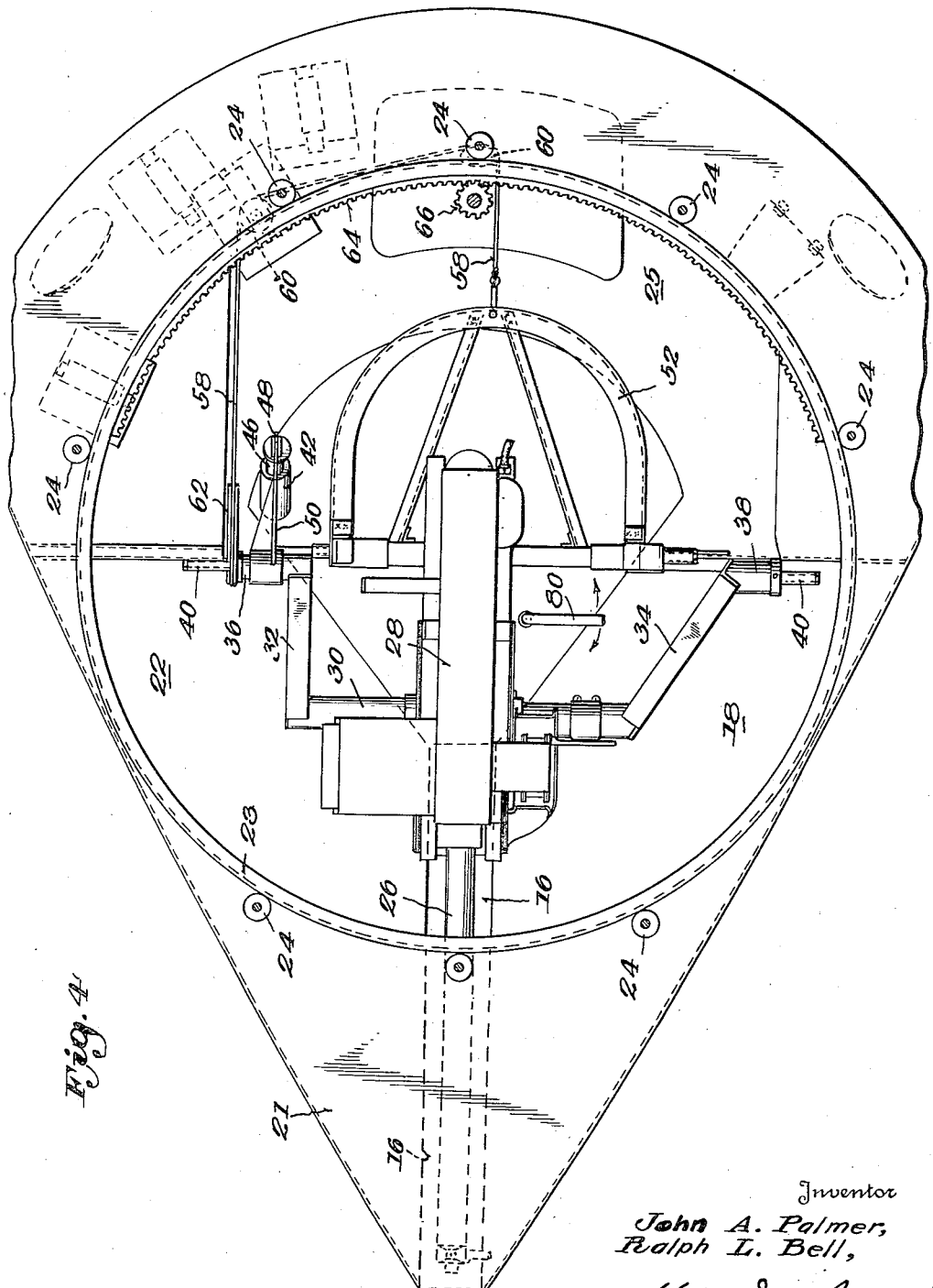

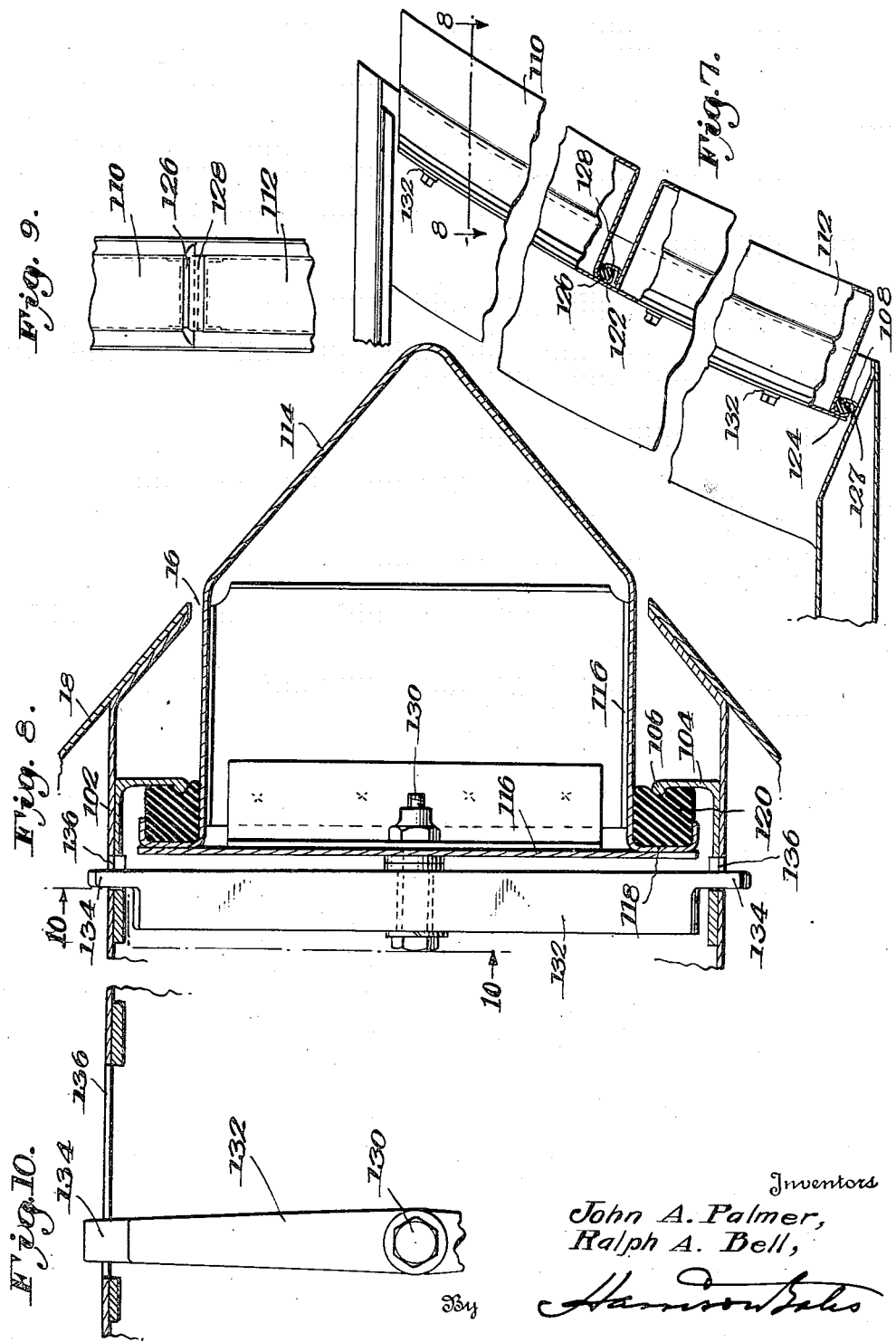

Patented Jan. 16, 1945

2,367,308

UNITED STATES PATENT OFFICE 2,367,308

AIRCRAFT AND GUN TURRET CONSTRUCTION

John A. Palmer and Ralph L. Bell, Baltimore, Md., assignors to The Glenn L. Martin Company, Baltimore, Md.

Application May 31, 1940, Serial No. 338,066

7 Claims. (Cl. 89—37.5)

The invention relates to aircraft and particularly to gun turrets therefor. The primary object of the invention is to provide a gun turret which is mounted in a portion of the aircraft having two generally vertical walls, which intersect one another.

The invention is particularly intended to be applied to an aircraft having a hull or bottom, and a tail-supporting portion spaced upwardly above the bottom. The present invention provides a turret mounted at the rear of the body of the aircraft in the portion of the surface thereof which connects the hull or bottom to the tail-supporting portion.

An object of the invention is to provide a turret in such a position which is mounted in a simple fashion and which permits protection of the rear of the aircraft by a gunner seated in the turret, giving a large angle of fire.

In turrets in which the gun moves vertically or in elevation in the turret, it is often difficult for the gunner to follow the sights of the gun while remaining properly seated. Another object of the present invention is to provide means by which the gunner is able during at least the greater part of the movement of the gun to keep the sights easily in front of him without moving from his seat. This is accomplished generally by providing means which move or tilt the gunner's seat in accordance with the movement of the gun.

Still another object of the invention is to provide a turret which turns around a vertical axis, and in which a gun is mounted for turning around a horizontal axis, with means in the turret for simultaneously controlling the up and down movement of the gun in the turret and the turning of the turret about its axis.

Still another object of the invention is to provide a gun movable in a slot in a turret, and mounting means which permit the gun to be retracted into an inoperative position completely within the confines of the aircraft, these mounting means being normally locked so as to hold the gun in its firing position.

Further objects and advantages will be seen from the following description, particularly when taken with the accompanying drawings which form a part thereof.

In the drawings:

Fig. 1 shows in side elevation a portion of an aircraft carrying a turret embodying the invention;

Fig. 2 is a transverse cross-section substantially on the line 2—2 of Fig. 1;

Fig. 3 is a longitudinal vertical section on the line 3—3 of Fig. 2;

Fig. 4 is a top plan view of the turret;

Fig. 5 is a detail cross-section on the line 5—5 of Fig. 3;

Fig. 6 is a top plan view on a smaller scale showing a portion of the aircraft body;

Fig. 7 shows in side elevation the slot closing members;

Fig. 8 is an enlarged cross-section on the line 8—8 of Fig. 7;

Fig. 9 is a detail view of the connection between the slot closing members.

Fig. 10 is a section on the line 10—10 of Fig. 8.

The invention is applied preferably to a flying boat having a body 2 supported by wings 4 and a hull 6 in which is arranged for example a step 8. The body has a rearwardly extending portion 10 for supporting the tail 11, this portion being spaced considerably above the bottom or hull 6. The general outline of the back edge of the body 2 from the hull 6 to the tail-supporting portion 10 is upward, with somewhat of a curvature towards the rear.

The present invention provides a turret arranged in this connecting portion. The turret is indicated generally at 12, and as shown in Figs. 1 and 6 completes the convergence of the side walls 14 toward the keel line, coming out substantially to an edge and having in its trailing edge a slot 16. The top and bottom of the side walls 18 of the turret extend close to and, when the turret is in the normal position shown in Fig. 6, form continuations of the side walls 14 converging toward the keel line.

The rear half of the turret is thus generally of triangular horizontal section. The turret is mounted to turn by bearing 20 at the bottom thereof, this bearing being suitably mounted in the body framework of the aircraft. At the top, the turret is provided with a wall or ceiling 21 having a large central circular opening 22 concentric with the axis of bearing 20. Around the edge of opening 22 the wall 21 has an upstanding track 23. This track is engaged by a series of rollers 24 carried by the aircraft body so as to mount the top of the turret turnably. The rear wall 25 of the turret is preferably formed in horizontal section as an arc of a circle about the axis of bearing 20. Thus the turret is free to turn in the aircraft about this axis to a very substantial degree.

The side and back walls of the turret, as will be apparent, are sloped downwardly and inwardly, so that the turret in longitudinal vertical section is generally trapezoidal in shape. As will be apparent from Fig. 2, this slope of the walls of the turret is a continuation of the slope of the adjacent walls 14 of the body of the aicraft. Mounted in the turret is a gun 26 of any suitable nature. This gun has a frame 28 which, by the mechanism to be described below, is normally releasably locked to a shaft portion 30. Shaft portion 30 has angular extensions 32 and 34, which carry at their ends bearing portions 36 and 38 respectively, which are mounted in bearings 40 in the side walls of the turret. In order to elevate or depress the gun, power operated mechanism is provided for turning the shaft 30 and thus the gun which is secured thereto. This comprises a hydraulic cylinder 42 pivoted at 44 to a frame rigid with the turret body, and having a piston 46 pivoted at 48 to an arm 50 which is rigidly secured on the bearing portion 36. It is obvious that when the cylinder is energized it will push up piston 46 and thus will tilt the gun downwardly.

The gunner sits on a seat 52 which is pivoted at 54 on the frame of the turret. A stop 56 on the back wall 22 of the turret limits the downward movement of the seat. To the back edge of the seat is connected a cable 58 which passing over pulleys 60 engages in a groove in a segment 62 which is also rigid with the shaft bearing portion 36. It is obvious that as the gun is depressed the seat 52 will be tilted upward and forward, while as the gun is elevated the seat will be tilted downward and backward. Thus the gunner is at all times kept in proper position with respect to the gun, while having adequate support on which he may sit.

The turret may be turned about its axis in any suitable manner. For example, the turret may carry on its top wall 21 a segmental rack 64 which is engaged by a gear 66 mounted on the shaft of a hydraulic motor 68. Motor 68 is supplied with operating fluid through suitable pipping 70 from a valve box 72 provided within the turret. Any suitable arrangement for conducting fluid through the bearing 20 may be provided.

Valve box 72 also is arranged to conduct fluid through pipe 78 to the bottom of cylinder 42 for elevating the gun. The valves of valve box 72 are controlled by a suitable lever 80, which may for instance be rocked backwards and forwards (Fig. 3) for elevating and depressing the gun, and may be turned as indicated by the arrows in Fig. 4 for controlling motor 68 and thus causing the turret to turn about its vertical axis. The gunner is thus able at all times to control the position of the gun both in train and in elevation.

When the gun is not in use, it is obviously desirable that it should not extend outwardly through the slot 16. For this purpose a releasable lock is provided between the frame 28 of the gun and the shaft 30. The details of this lock are shown in Figs. 3 and 5. As shown, frame 28 has a semi-cylindrical portion 82 secured thereon through which the shaft 30 extends. Pivoted by pin 85 to one end of the semi-cylindrical portion 82 is a second semi-cylindrical portion 83. These parts are secured together on the side of the shaft 30 opposite pivot 85 by a bolt 87. Portion 83 has a projecting part 84 having a bore therein extending at right angles to the shaft 30. Shaft 30 is provided with a cutout or notch 86, this notch being formed by a partly circular cut in a direction transverse to the axis of the shaft. In the bore of member 84 is a pin or locking member 88 which likewise has a partly cylindrical notch 90. This locking member 88 is capable of being turned in the bore by an extending portion 91.

When the parts are in the position shown in the drawings, it is evident that shaft 30 cannot turn in portion 32, because the solid part of pin 88 is engaged in notch 86. The gun is thus locked to the shaft 30. If, however, the pin 88 is turned by 180° around its axis, notch 90 is opposite the shaft 30 and the portion 82 may then turn with respect to shaft 30 so that the gun is no longer locked to the shaft.

When the mechanism just described is released, the rear end of the gun may be tilted upwardly through opening 22 and the gun may be withdrawn into the turret and the adjacent portion of the aircraft, whereupon the muzzle of the gun is inserted into and held by a suitable socket 92.

In operation, the gun is lifted from the broken line position of Fig. 3 and is turned until locking pin 88 can be engaged. Thereafter, the gunner by controlling lever 80 turns the gun to the suitable positions in train and elevation.

When the gun is not in use, it is desirable to close the slot 16 to prevent the entrance of water. The arrangement for doing this is shown in Figs. 7 to 10.

Running along each side of the slot, and extending inwardly from the side walls 18, are frame members 102. Mounted on these members are angle irons 104, directed towards each other, and provided at their free edges with beads 106. A similar angle iron 108 is arranged across the bottom of the slot.

Two closure members 110 and 112 are provided. Each of these consists of a portion 114 of triangular cross section the base of which substantially fills the slot 16, while the sides form extensions of the side walls 18 and complete the outline of the hull to an apex. The members then have a frame 116 which extends between angle members 104. Within these members frame 116 has outward extensions 118. Elastic strips 120, of rubber, or the like, are secured on members 118 to engage angle members 104.

At their bottom edges members 110 and 112 each are provided with flanges 122 and 124, respectively, which carry rubber strips 126 and 127. Member 112 at its upper edge carries an angle member 128. In assembling the slot closure, member 112 is first inserted into position from the inside of the turret, or from the left in Figs. 7 and 8. Rubber strips 120 and 127 engage angle members 104 and 108 respectively. Member 110 is then inserted and strips 120 and 126 engage angle members 104 and 128. Thus the slot is sealed.

To hold the closure members in place, the arrangement shown in Figs. 8 and 10 is used. Frame 116 carries pivots 130 on which are mounted latch members 132 having reduced ends 134 which can engage in slots 136 in walls 102. By turning latches 132, until the ends are engaged in the slots, the closure members will be held in position.

While we have described herein one embodiment of our invention, we wish it to be known that we do not intend to limit ourselves thereby, except within the scope of the appended claims.

We claim:

1. In an aircraft having a body provided with rearwardly converging side walls, a turret in said body having walls forming continuations of the side walls and having a slot adjacent the point of convergency thereof, and means mounting said turret to turn in said body about a substantially vertical axis.

2. In an aircraft having a turret mounted to turn about a substantially vertical axis, said turret having a substantially vertical slot therein, a transverse bent shaft mounted to turn in said turret about a substantially horizontal axis, a gun having a frame mounted on a portion of said shaft out of alignment with the axes of the bearings thereof, and means for releasably locking said gun to said portion, whereby when said gun is locked to said portion it may be moved up and down in said slot, while when said gun is unlocked it may be completely retracted within the turret to an inoperative position therein.

3. In an aircraft having a body with a bottom and a tail-supporting portion spaced above the bottom, said body being provided with rearwardly converging side walls, a turret forming part of the rear surface connecting the rear end of the bottom and the bottom surface of said tail-supporting portion, said turret having walls forming continuations of the side walls and having a slot adjacent the point of convergency thereof, said turret being mounted to turn about a substantially vertical axis.

4. In an aircraft having a body provided with substantially straight converging walls, a turret in said body of substantially triangular shape in cross section having walls forming continuations of said body walls, and having a gun slot against the point of convergency thereof, and means to mount said turret to turn in said body about a vertical axis.

5. In an aircraft having a turret mounted to turn about a substantially vertical axis, a transverse bent shaft mounted to turn in bearings in said turret about a horizontal axis and having a portion out of alignment with the axes of the bearings thereof, a gun having a frame mounted on said shaft portion, said turret having a slot therein extending substantially from the bottom to the top thereof, and means for releasably locking said gun to said shaft portion, whereby when said gun is locked to said portion it may be moved up and down in said slot, while when said gun is unlocked it may be completely retracted within the turret to an inoperative position therein.

6. In combination, a stepped seaplane hull, a dirigible turret having converging sides mounted in said hull adjacent the keel on the keel line above a step, said sides of said turret being extensions of the sides of the hull and converge toward the keel line.

7. In combination, a stepped seaplane hull, a dirigible turret having converging sides mounted in said hull adjacent the keel on the keel line above a step, said sides of said turret being extensions of the sides of the hull and converge toward the keel line, a slot formed between said sides substantially on the keel line to permit gun fire therethrough, and means for mounting said turret for turning about a substantially vertical axis.

JOHN A. PALMER.
RALPH L. BELL.